(No Model.)
R. G. HANFORD, Jr.
GAG RUNNER FOR BRIDLES.
No. 319,408. Patented June 2, 1885.
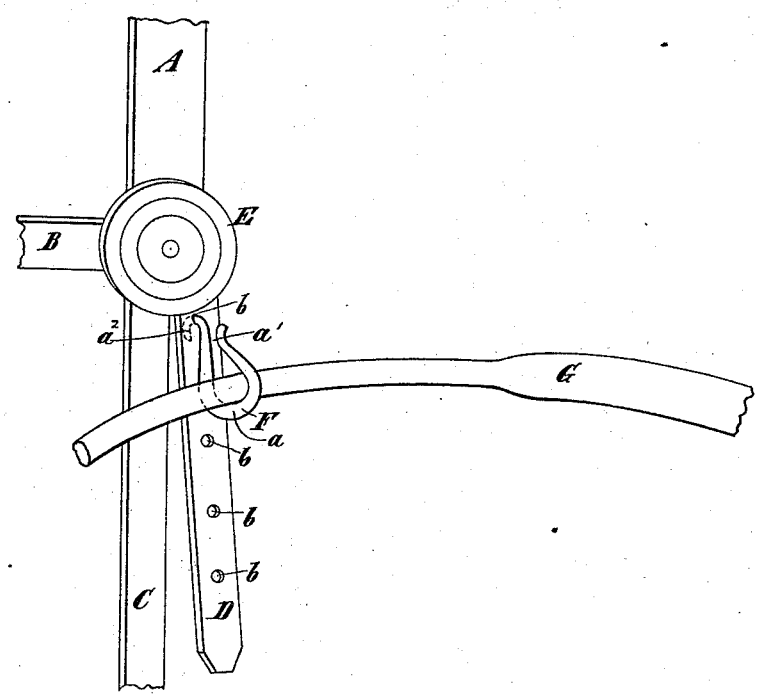
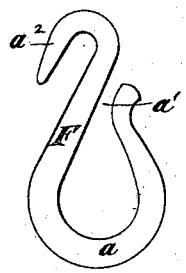
Witnesses
Edward J. Roche
James R. Bowen
Inventor
Robert G. Hanford Jr.
by his attorneys,
Gifford & Brown

United States Patent Office.

ROBERT G. HANFORD, JR., OF NEWARK, NEW JERSEY, ASSIGNOR TO CRANE & CO., OF SAME PLACE.

GAG-RUNNER FOR BRIDLES.

SPECIFICATION forming part of Letters Patent No. 319,408, dated June 2, 1885.

Application filed May 12, 1884. (No model.)

*To all whom it may concern:*

Be it known that I, ROBERT G. HANFORD, Jr., of Newark, in the county of Essex and State of New Jersey, have invented a certain new and useful Improvement in Gag-Runners for Harness, of which the following is a specification.

This improvement relates to gag-runners, such as are used in harness for receiving check-reins.

As gag-runners have heretofore been made the check-reins can be inserted only by unbuckling the check-reins and passing or threading them endwise through the loops of the gag-runners, and can be removed only by unbuckling them and pulling them endwise out of the said loops. It is the object of my improvement to avoid the trouble incident to thus inserting check-reins in the loops of gag-runners and removing them from the loops of the gag-runners.

I will describe a gag-runner embodying my improvement, and then point out the novel features in a claim.

In the accompanying drawings, Figure 1 is a perspective view of a part of a bridle provided with a gag-runner embodying my improvement, and Fig. 2 is a side view of the gag-runner detached.

Similar letters of reference designate corresponding parts in both figures.

A designates the top strap of a bridle. B designates the front strap thereof. C designates the cheek-strap of the same. D designates the throat-latch, billet, or strap; and E designates a rosette at the junction of these straps.

F designates a gag-runner. It has a loop, $a$, which is provided with an opening, $a'$, at the upper part; or, in other words, is made in the form of a hook with the end extended upward and close to the shank or main portion. As here shown, this gag-runner is provided with means for connecting it to a bridle, consisting of a hook, $a^2$, extending in the reverse direction from the loop $a$, and adapted to engage with one of a number of holes, $b$, in the throat-latch, billet, or strap D; but the gag-runner may be provided with any other suitable means for connecting it with the bridle.

When that portion of the check-rein which normally fits in the gag-runner is rounded, and the portion in rearward thereof is made flat, the opening $a'$ of the loop $a$ is made too small for the passage of the rounded portion, but large enough for the passage of the flat portion. In such case the check-rein may be unhooked from the saddle-tree, so as to allow its flat portion to be run into the loop $a$, and then the check-rein may be slipped out again, hooked so as to afford a horse freedom without allowing him to lower his head to the ground while he is standing. Afterward the check-rein can be unhooked, its flat portion slipped edgewise into the loop and again hooked.

What I claim as my invention, and desire to secure by Letters Patent, is—

The combination, with a bridle provided with a check-rein having a rounded portion and a flat portion, of the gag-runner provided with a hook at one end for attachment to the bridle, its body portion formed into a loop the opening of which is adapted to admit the flat portion of the rein, and so contracted that the rounded portion cannot slip out of the loop, all substantially as set forth.

ROBERT G. HANFORD, JR.

Witnesses:
OBA WOODRUFF,
WM. M. BERRY.